(12) United States Patent
Gunturi et al.

(10) Patent No.: US 7,568,162 B2
(45) Date of Patent: Jul. 28, 2009

(54) VISUAL HELPS WHILE USING CODE ASSIST IN VISUAL TOOLS

(75) Inventors: Srimanth Gunturi, Raleigh, NC (US); Peter A. Walker, Fuquay-Varina, NC (US); Joseph R. Winchester, Otterbourne (GB)

(73) Assignee: International Business Machines Corporation, Armonk, NY (US)

( * ) Notice: Subject to any disclaimer, the term of this patent is extended or adjusted under 35 U.S.C. 154(b) by 433 days.

(21) Appl. No.: 11/450,017

(22) Filed: Jun. 9, 2006

(65) Prior Publication Data

US 2007/0288867 A1    Dec. 13, 2007

(51) Int. Cl.
*G06F 3/048* (2006.01)
(52) U.S. Cl. .............. 715/763; 715/711; 715/762; 715/816; 715/825; 715/967; 717/107; 717/109; 717/113
(58) Field of Classification Search ............. 715/762, 715/763, 825, 711, 816, 967; 717/109, 107, 717/113
See application file for complete search history.

(56) References Cited

U.S. PATENT DOCUMENTS

| | | | |
|---|---|---|---|
| 5,353,401 A | | 10/1994 | Iizawa et al. |
| 5,696,914 A | | 12/1997 | Nahaboo et al. |
| 5,828,376 A | * | 10/1998 | Solimene et al. ............ 715/821 |
| 6,105,036 A | * | 8/2000 | Henckel ................... 707/104.1 |
| 6,467,081 B2 | * | 10/2002 | Vaidyanathan et al. ...... 717/123 |
| 6,489,970 B1 | | 12/2002 | Pazel |
| 6,502,233 B1 | * | 12/2002 | Vaidyanathan et al. ....... 717/101 |
| 6,857,103 B1 | * | 2/2005 | Wason ........................ 715/709 |
| 7,051,279 B2 | * | 5/2006 | Simonyi ..................... 715/705 |
| 7,137,071 B2 | * | 11/2006 | Fuller et al. ................. 715/771 |
| 7,284,233 B2 | * | 10/2007 | Sengodan ................... 717/102 |
| 2003/0058267 A1 | | 3/2003 | Warren |
| 2004/0001092 A1 | | 1/2004 | Rothwein et al. |
| 2004/0001099 A1 | | 1/2004 | Reynar et al. |
| 2004/0031017 A1 | * | 2/2004 | Vaidyanathan et al. ...... 717/110 |
| 2004/0036719 A1 | | 2/2004 | Van Treeck |
| 2004/0233237 A1 | | 11/2004 | Randow |
| 2005/0028107 A1 | | 2/2005 | Gomes et al. |

* cited by examiner

*Primary Examiner*—Kieu D Vu
*Assistant Examiner*—Patrick F Riegler
(74) *Attorney, Agent, or Firm*—Martin J. McKinley; Law Office of Jim Boice

(57) ABSTRACT

A method, apparatus and computer-readable medium for improved correlation between source code in a source code view pane and a corresponding control in a graph view pane in an Integrated Development Environment (IDE) is presented. In one embodiment, the method includes the steps of receiving, from a user of a source code view pane, an entered name of a type of control that is to be modified in an Integrated Development Environment (IDE), wherein the control is displayed in a graph view pane of a Graphical User Interface (GUI); in response to a hyperbutton being activated, displaying a mini-GUI in the source code view pane, wherein the mini-GUI displays all controls that have the entered name as part of their source code; and in response to a selection of a selected control in the mini-GUI, dismissing the mini-GUI and pasting, in the source code view pane, a name of an actual source code object that, when executed, displays the selected control in the GUI.

4 Claims, 13 Drawing Sheets

| 8 User | ☒ Address | 🔔 Accounts Payable |

| Name | 102a |
| Password | 102b |
| Email | 102c |
| Credit Card Number | 102d |
| Credit Card Type | 102e |

[Apply] [Revert]

```
text1 = new Text (composite1, SWT.BORDER) :
text2 = new Text (composite1, SWT.BORDER) :
text3 = new Text (composite1, SWT.BORDER) :
text4 = new Text (composite1, SWT.BORDER) :
text5 = new Text (composite1, SWT.BORDER) :
```

FIG. 1B
(PRIOR ART)

| text1.getTe | | |
|---|---|---|
| text2 = new | o getText() String - Text | Returns the widget text. |
| text3 = new | o getText(int start, int end) String - Text | The text for a text widget is the characters in the empty string if this has never been set. |
| text4 = new | o getTextLimit() int - Text | Returns: |
| text5 = new | | the widget text |

FIG. 1C
(PRIOR ART)

WHICH
TEXT
FIELD
SHOULD
BE USED?

text1 = new Text (composite1, SWT.BORDER) :
text2 = new Text (composite1, SWT.BORDER) :
text3 = new Text (composite1, SWT.BORDER) :
text4 = new Text (composite1, SWT.BORDER) :
text5 = new Text (composite1, SWT.BORDER) :

FIG. 1D
(PRIOR ART)

| Property | Value |
|---|---|
| >Field name | text1 |
| font | Tahoma,8 |
| foreground | Color {0, 0, 0} |
| horizontalScroll | <not set> |

text1 = new Text (composite1, SWT.BORDER) :

text2 = new Text (composite1, SWT.BORDER) :

text3 = new Text (composite1, SWT.BORDER) :

text4 = new Text (composite1, SWT.BORDER) :

text5 = new Text (composite1, SWT.BORDER) :

| text1 |

FIG. 1H
(PRIOR ART)

```
text1 = new Text (composite1, SWT.BORDER) :
text2 = new Text (composite1, SWT.BORDER) :
text3 = new Text (composite1, SWT.BORDER) :
text4 = new Text (composite1, SWT.BORDER) :
text5 = new Text (composite1, SWT.BORDER) :
text1
```

VISUAL HELPS WHILE USING CODE ASSIST IN VISUAL TOOLS

BACKGROUND OF THE INVENTION

The present invention relates in general to the field of computers and similar technologies, and in particular to software utilized in this field. Still more particularly, the present invention affords an improved correlation between source code in a source code view pane and a corresponding control in a graph view pane in an IDE.

Visual design tools are often used to help designers develop and build Graphical User Interface (GUI) programs and/or web pages. These visual design tools usually have a rectangle drawing area called a "Design" view (a.k.a., "graph view pane") which allows the designer to lay out various GUI controls in a WYSIWYG ("What You See Is What You Get) manner. GUI controls (or widgets) are usually things like labels, text objects, tables, etc., which are used in the construction of the overall GUI.

Depending on the technology for which the visual tool is being used, source code is generated to allow the GUI to be executed in the runtime. For example, HyperText Markup Language (HTML) or a Java Servlet Page would be generated for a Web interface type application, or Java code would be generated for a Java based GUI application. Oftentimes it is necessary to access the source code in order to set additional properties or to write business logic to be executed when an action is performed on one of the GUI controls. For example, an HTML form with a "Submit" button may need to have some logic added to the button so when it is selected, it gathers the data from all the controls on the page and sends it to the server to be processed.

The visual tool also usually provides a "Source" view (a.k.a., "source code view pane") to allow the designer to add the additional code needed to get the desired behavior. In the source view, code assistance is also available to help the designer with applying various actions or methods to the targeted control or for accessing the control in order to retrieve information (e.g. the text information from a text field). FIG. 1a shows an example of a GUI 100 that contains a number of text fields 102a-e. The user can tell visually which text field 102 is used for which purpose. As shown in exemplary form in FIG. 1a, the topmost text field 102a is for entering the user's name, the one beneath (text field 102b) is for entering their password, and so forth. This knowledge comes from the visual placing of the controls on the GUI and their relationship to labels, tab titles, or other visual cues such as column headers. It is a cognitive process whereby the designer, and the user, know which text box is used for entering which piece of data.

By contrast, in the actual program that the developer uses to construct the GUI, the fields may be known by more anonymous names. In the example above, which was built with a GUI tool, the text fields 102a-e were named text1, text2, text3 and so forth, as shown by the code depicted in FIG. 1b. The problem is that at development time, when the user wishes to access a particular text field, such as to get or set its contents or perform other logic, the source program only knows them by their semantic names. An example of this is during code assist (a feature designed to help the user identify which program artifacts they can use), in which the list presented contains the fields only by their names, as shown in the code depicted in FIG. 1c. This means that if the user wishes to perform the step "get the contents of the e-mail field", they need to know which of the fields it is by name. It may be that it is text3 because it is the third field down on the GUI; or it may be that text3 is on another notebook page that was created first before the "User" tab was created; or it may be that text3 was created and deleted and in fact the Email field is text9. Thus, fields can be dropped and moved and re-ordered, and the problem that this invention tackles is how the user can relate a semantic field name to its visual occurrence on the GUI.

Thus, in the example shown above, assume that the user wishes to set the contents of the user's name. For this the code developer (designer) needs to access the text field corresponding to the "Name" in the application. This requires the following five steps:

Step 1. In the source view, the designer looks at the code generated for each of the text controls and tries to determine which text control should be accessed. The names are not named in a way that makes it easy to find as they were generated by a GUI builder tool.

Step 2. Since it is not clear which control corresponds to the "Name" text field, as illustrated in the code shown in FIG. 1d, the designer must determine what the name of the text field to the right of the "Name" label is, and does this by navigating to the Design view. This step means that the cursor loses focus from the source view, so when the designer has eventually determined the name, he must return to the source tab and relocate the cursor at the position where it previously was.

Step 3. In the "Design" view, the user selects the text field 102a to view its properties, as shown in FIG. 1e. The "Properties" view 104, shown in FIG. 1f, will list all the properties for the text field that should include the field name of the control.

Step 4. The designer navigates to the "Properties" view and scrolls down through the properties to get to the name of the text field. He must then make a mental note of what that text field is called—in this case "text1."

Step 5. Rather than make a mental note, and since the name may be long and machine generated, the designer might select the name and copy it to the system clipboard for later pasting into the source view, as shown in GUI 106 in FIG. 1g.

Step 6. The designer navigates back to the source view, scrolls down to the code he was previously at in Step 1, presses "Enter" to create a new line to begin writing code (as shown in FIG. 1h), and then pastes the name of the control into the source code or enters it by hand having remembered the name seen in Step 4.

These just described steps are time consuming, distracting, and prone to error, since the designer may inadvertently apply additional logic to the wrong control in the source view if the name were typed in from memory instead of using copy/paste. A solution is needed that allows the designer to easily pick the targeted control while in the source view and have the name of the control placed in the context of the source code without having to go through the many tedious, distracting steps just described.

SUMMARY OF THE INVENTION

As described above, there is a need for a computer-implementable method, system and computer-usable medium that affords an improved correlation between source code in a source code view pane and a corresponding control in a graph view pane in an Integrated Development Environment (IDE). In one embodiment, the computer-implementable method includes the steps of receiving, from a user of a source code view pane, an entered name of a type of control that is to be modified in an Integrated Development Environment (IDE), wherein the control is displayed in a graph view pane of a Graphical User Interface (GUI); in response to a hyperbutton being activated, displaying a mini-GUI in the source code view pane, wherein the mini-GUI displays all controls that have the entered name as part of their source code; and in response to a selection of a selected control in the mini-GUI, dismissing the mini-GUI and pasting, in the source code view pane, a name of an actual source code object that, when executed, displays the selected control in the GUI.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

FIGS. 1a-h illustrates a prior art method of editing source code that is associated with a field or device in a Graphical User Interface (GUI) that is under construction;

DETAILED DESCRIPTION OF THE PREFERRED EMBODIMENT

The present invention presents a method, system, and computer-readable medium for providing a visual help in the form of a rectangular window that provides a scaled down view of the "Design" view so the designer can select the specific control and paste the control name into the source view at the cursor position. This allows the designer to be precise in picking the control in which additional logic can be applied. This provides an advantage to the designer, who does not have to hunt and pick from other views and does not have to decipher the surrounding code to figure out which control is the correct one to apply the code. Thus, by providing visual helps in the source view for visual design tools, visual designers can be more precise, accurate, and efficient when adding additional logic to existing visual controls when developing applications, including Graphical User Interface (GUI) applications.

Figures 1E, 1F:
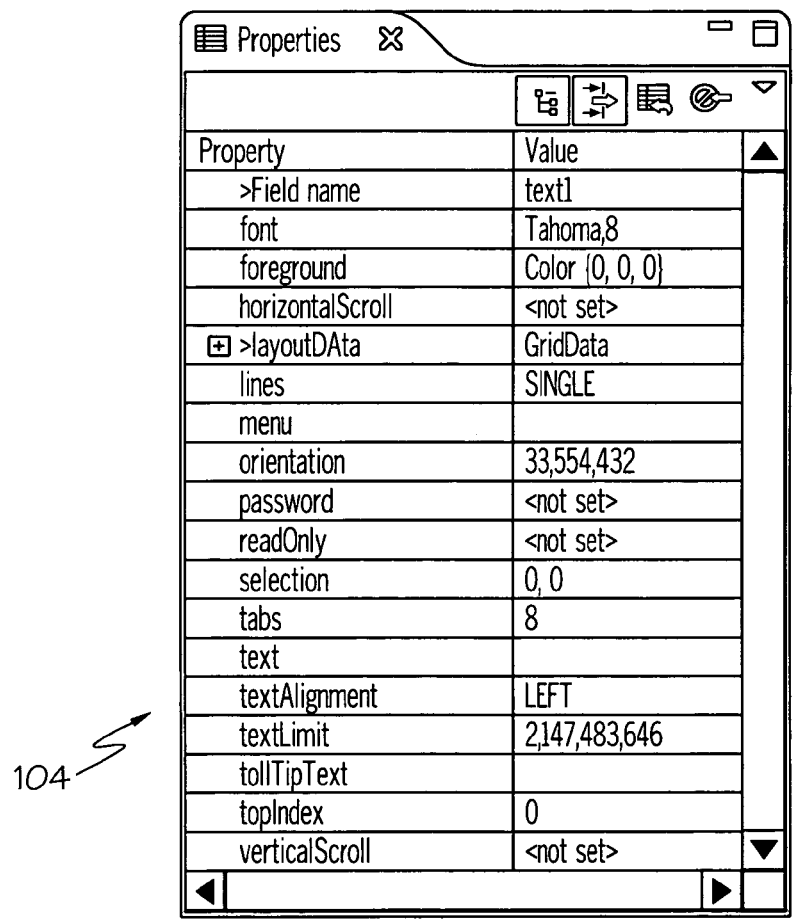
Figures 2A, 2B:
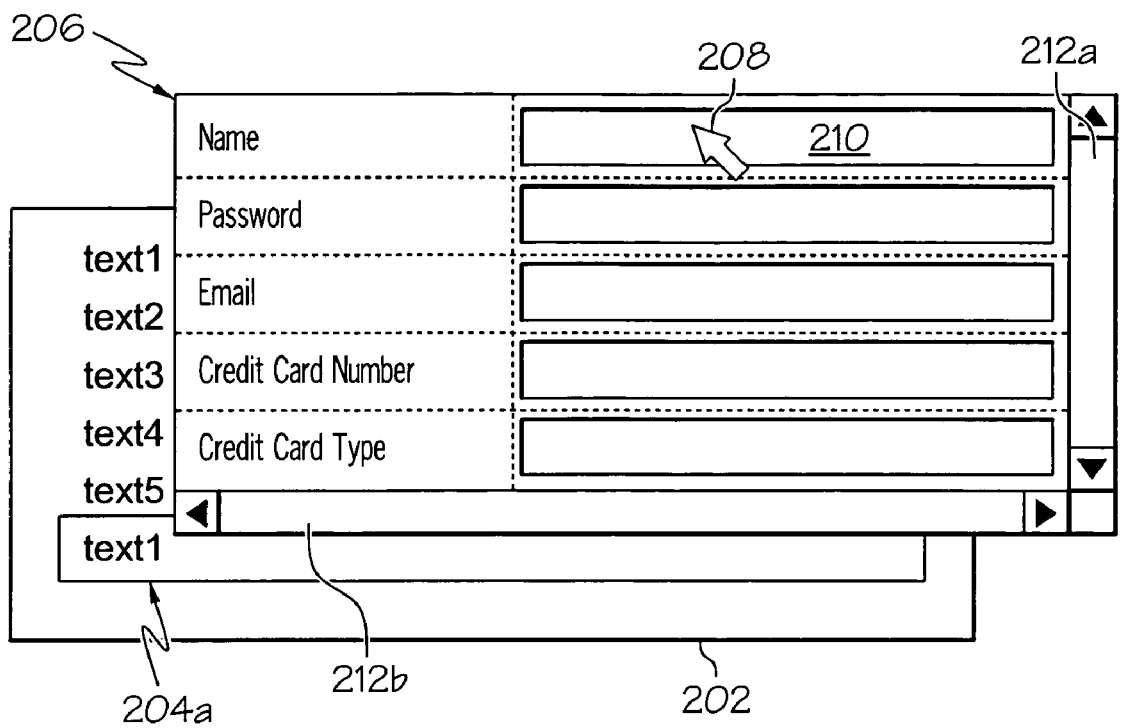
FIGS. 2a-b depict a novel code assist that presents a mini-GUI that aids in the correlation between a particular line or section of source code in a source code view pane, of an Integrated Development Environment (IDE), with a particular field or widget in a GUI that is under construction.

With reference now to FIG. 2a, there is depicted a source code view pane 202 from an Integrated Development Environment (IDE). As shown more clearly in FIG. 2b, source code view pane 202 shows five lines of code related to "text1" to "text5." Each of these lines of code describe and/or define a text field that is found in a GUI that is under construction or is being modified. (Note that while "text" is used in the presently described embodiment and example, the present invention is equally applicable and useful when attempting to correlate any piece of source code with a field, widget or other control in a GUI, as described herein.)

Returning now to FIG. 2a, assume that a developer wishes to modify the code that supports a particular text field 210, which is found in a GUI under construction. However, while the developer knows that the field has name "text" in its name, the developer may not know which "text" object is associated with a particular field in the GUI under construction. Thus, the developer cursors down to a new line in the source code view pane 202, and types the term "text" (204a). This results in a mini-GUI 206 popping up in the source code view pane 202, which shows all fields, in a GUI under construction in an IDE, that are supported/defined by a source code object having "text" in its name.

Assume now that the developer wishes to modify the source code that is associated with a name field 210. (Note that if the size of the mini-GUI 206 is too small to depict all relevant fields or widgets in the GUI under construction, the slider bars 212a-b may be used to scroll around the GUI under construction to show all relevant fields/widgets.) By moving a cursor 208 over the name field 210, and clicking thereon, two events occur. First, in the source code view pane 202, the term "text" (204a) is replaced with "text1" (204b), signifying that the selected field is supported/defined by the source code object named "text1", as shown in FIG. 2b. Second, the mini-GUI 206 is dismissed (disappears), thus allowing the developer to proceed with editing of the source code object titled "text1".

Figure 2C:
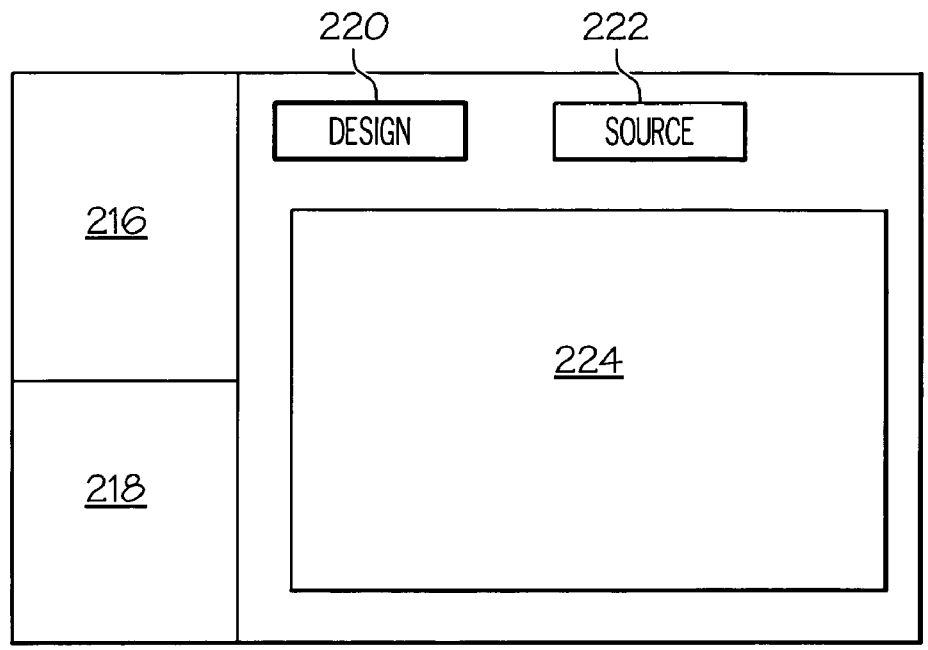
FIGS. 2c-d illustrate an exemplary IDE GUI used with the present invention.
Figure 2D:
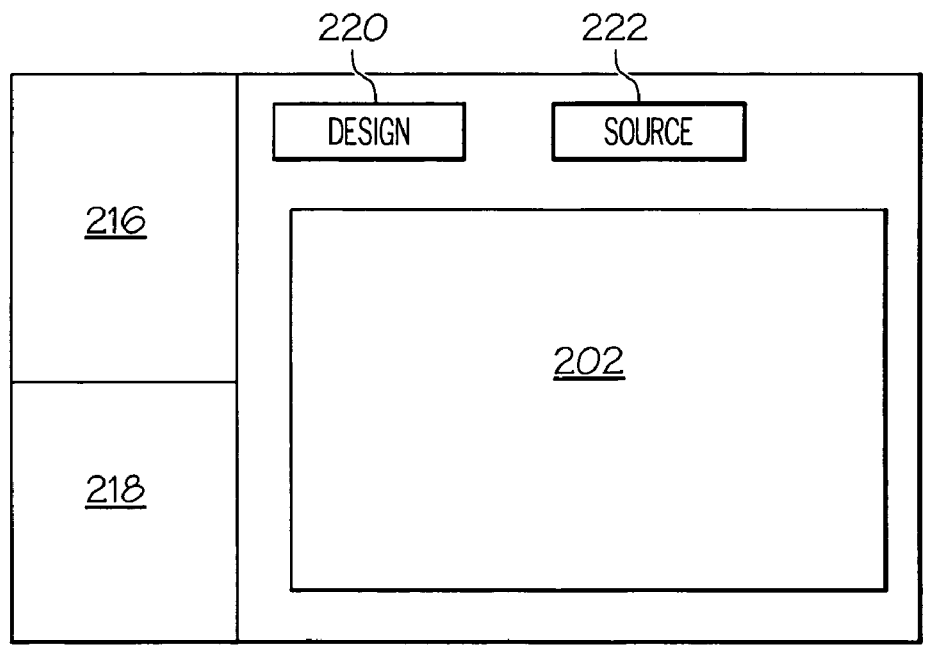

Note that the presently describe invention is particularly useful in IDE's in which a What-You-See-Is-What-You-Get (WYSIWYG) graph view pane and a source code view pane are on different screens (either on separate monitors or separately viewed by toggling between screens). For example, as shown in FIG. 2c, an IDE GUI 214, which has a source outline view pane 216 and a component outline view pane 218, also has a "Design" button 220 and "Source" button 222. When "Design" button 220 is clicked, then a full view of the WYSIWYG graph view pane 224 is displayed. When "Source" button 222 is clicked, then WYSIWYG graph view pane 224 is dismissed, and source code view pane 202 is displayed, as shown in FIG. 2d. Thus, display of the WYSIWYG graph view pane 224 and the source code view pane 202 can be toggled back and forth without losing the display of the rest of the IDE GUI 214 (including the source outline view pane 216 and the component outline view pane 218). In the IDE GUI 214 shown in FIGS. 2c-d, then the mini-GUI 206 can be popped-up while in the "Source" mode (source code view pane 202 is displayed), or the source code can be popped up while in the "Design" mode (WYSIWYG graph view pane 224 is being displayed). However, the invention is also useful in IDE's in which the graph view pane and source code view pane are on a single screen, due to resolution issues, etc. However, if the resolution of the graph view pane (showing the GUI under construction) is sufficient, then in an alternative embodiment the fields or widgets under scrutiny (in mini-GUI 206) may alternatively or additionally be highlighted in the graph view pane in the IDE.

Figure 3:
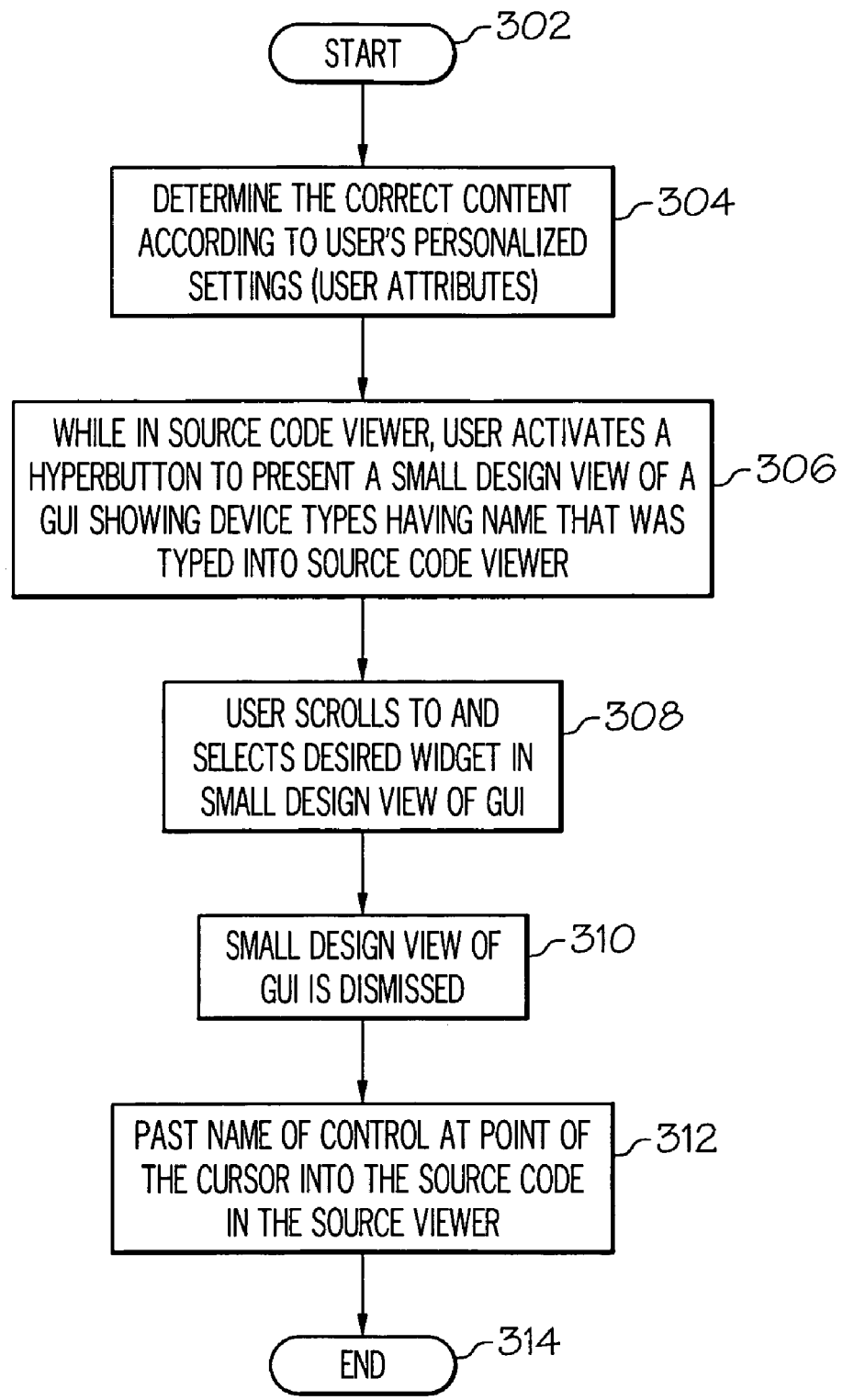
FIG. 3 is a flow-chart showing exemplary steps taken to correlate a particular line or section of source code with a particular field or widget in a GUI that is under construction.

With reference now to FIG. 3, there is depicted a flow-chart of exemplary steps taken in the present invention to identify which control/field/widget in a GUI under construction/modification is associated with a particular source code object. After initiator block 302, a user types onto a new line in the source code viewer a name of a type of device being edited (block 304). The user then clicks a hyperbutton (e.g., a function or control key) while a cursor is over the just-typed name, resulting in a mini-GUI popping up (block 306). This mini-GUI shows all controls/fields/widgets/components of a GUI under construction that have the just-typed name. In the mini-GUI, the user scrolls to (if necessary) and places a cursor over the desired control/field/widget/component (block 308). This results in the mini-GUI being dismissed (block 310), and the name of the selected control/field/widget/component is pasted into the source code viewer (block 312), allowing the developer to enter new code for that object name. The process thus ends at terminator block 314.

Figure 4:
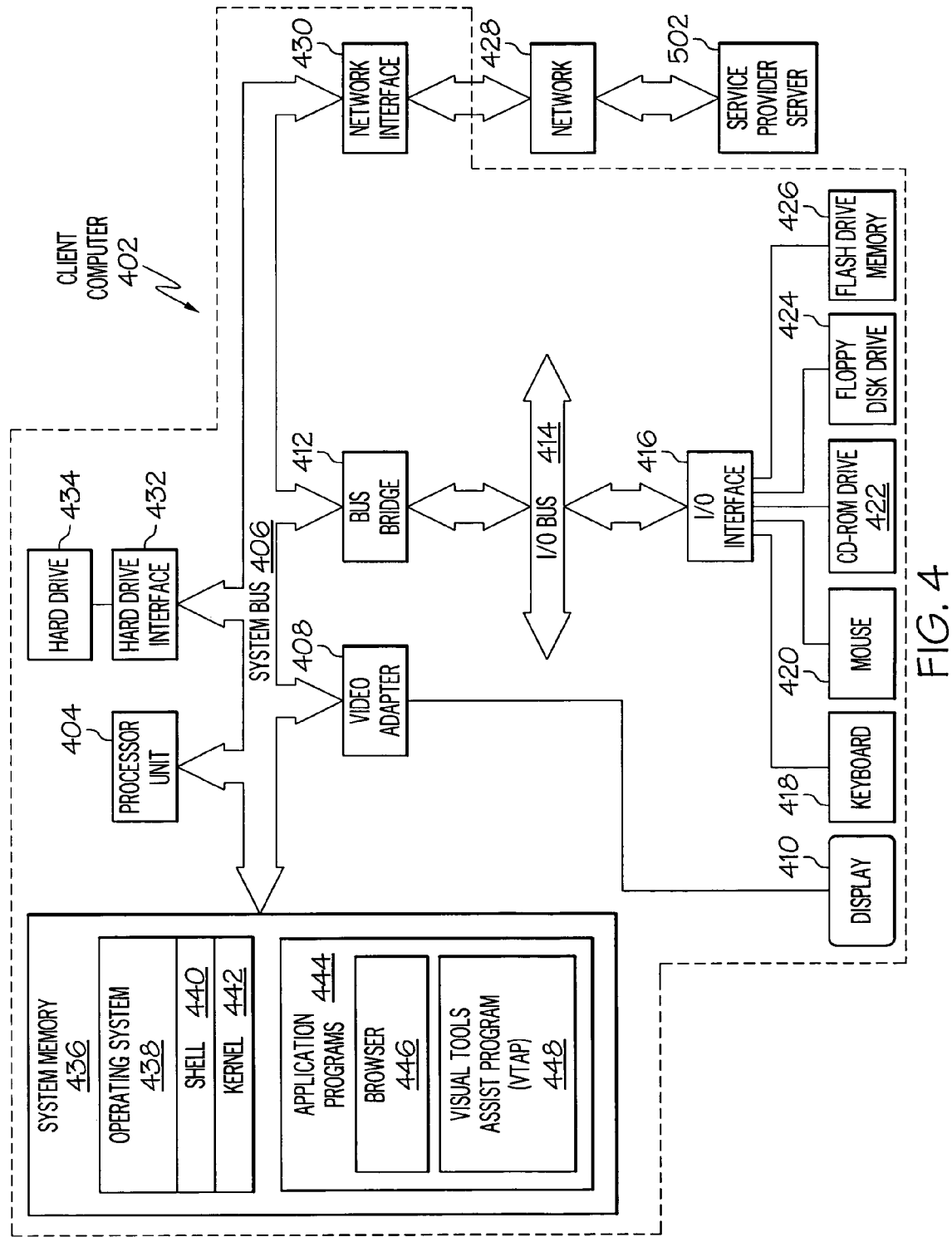
FIG. 4 depicts an exemplary client computer in which the present invention may implemented.

With reference now to FIG. 4, there is depicted a block diagram of an exemplary client computer 402, in which the present invention may be utilized. Client computer 402 includes a processor unit 404 that is coupled to a system bus 406. A video adapter 408, which drives/supports a display 410, is also coupled to system bus 406. System bus 406 is coupled via a bus bridge 412 to an Input/Output (I/O) bus 414. An I/O interface 416 is coupled to I/O bus 414. I/O interface 416 affords communication with various I/O devices, including a keyboard 418, a mouse 420, a Compact Disk—Read Only Memory (CD-ROM) drive 422, a floppy disk drive 424, and a flash drive memory 426. The format of the ports connected to I/O interface 416 may be any known to those skilled in the art of computer architecture, including but not limited to Universal Serial Bus (USB) ports.

Client computer 402 is able to communicate with a service provider server 502 via a network 428 using a network interface 430, which is coupled to system bus 406. Network 428 may be an external network such as the Internet, or an internal network such as an Ethernet or a Virtual Private Network (VPN). Using network 428, client computer 402 is able to use the present invention to access service provider server 502.

A hard drive interface 432 is also coupled to system bus 406. Hard drive interface 432 interfaces with a hard drive 434. In a preferred embodiment, hard drive 434 populates a system memory 436, which is also coupled to system bus 406. Data that populates system memory 436 includes client computer 402's operating system (OS) 438 and application programs 444.

OS 438 includes a shell 440, for providing transparent user access to resources such as application programs 444. Generally, shell 440 is a program that provides an interpreter and an interface between the user and the operating system. More specifically, shell 440 executes commands that are entered into a command line user interface or from a file. Thus, shell 440 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 442) for processing. Note that while shell 440 is a text-based, line-oriented user interface, the present invention will equally well support other user interface modes, such as graphical, voice, gestural, etc.

As depicted, OS 438 also includes kernel 442, which includes lower levels of functionality for OS 438, including providing essential services required by other parts of OS 438 and application programs 444, including memory management, process and task management, disk management, and mouse and keyboard management.

Application programs 444 include a browser 446. Browser 446 includes program modules and instructions enabling a World Wide Web (WWW) client (i.e., client computer 402) to send and receive network messages to the Internet using HyperText Transfer Protocol (HTTP) messaging, thus enabling communication with service provider server 502.

Application programs 444 in client computer 402's system memory also include a Visual Tools Assist Program (VTAP) 448, which includes logic for storing pre-dropped components in memory before, during, and after final execution of the objects through the IDE. VTAP 448 includes code for implementing the processes described in FIGS. 2a-3. In one embodiment, client computer 402 is able to download VTAP 448 from service provider server 502.

The hardware elements depicted in client computer 402 are not intended to be exhaustive, but rather are representative to highlight essential components required by the present invention. For instance, client computer 402 may include alternate memory storage devices such as magnetic cassettes, Digital Versatile Disks (DVDs), Bernoulli cartridges, and the like. These and other variations are intended to be within the spirit and scope of the present invention.

Figure 5:
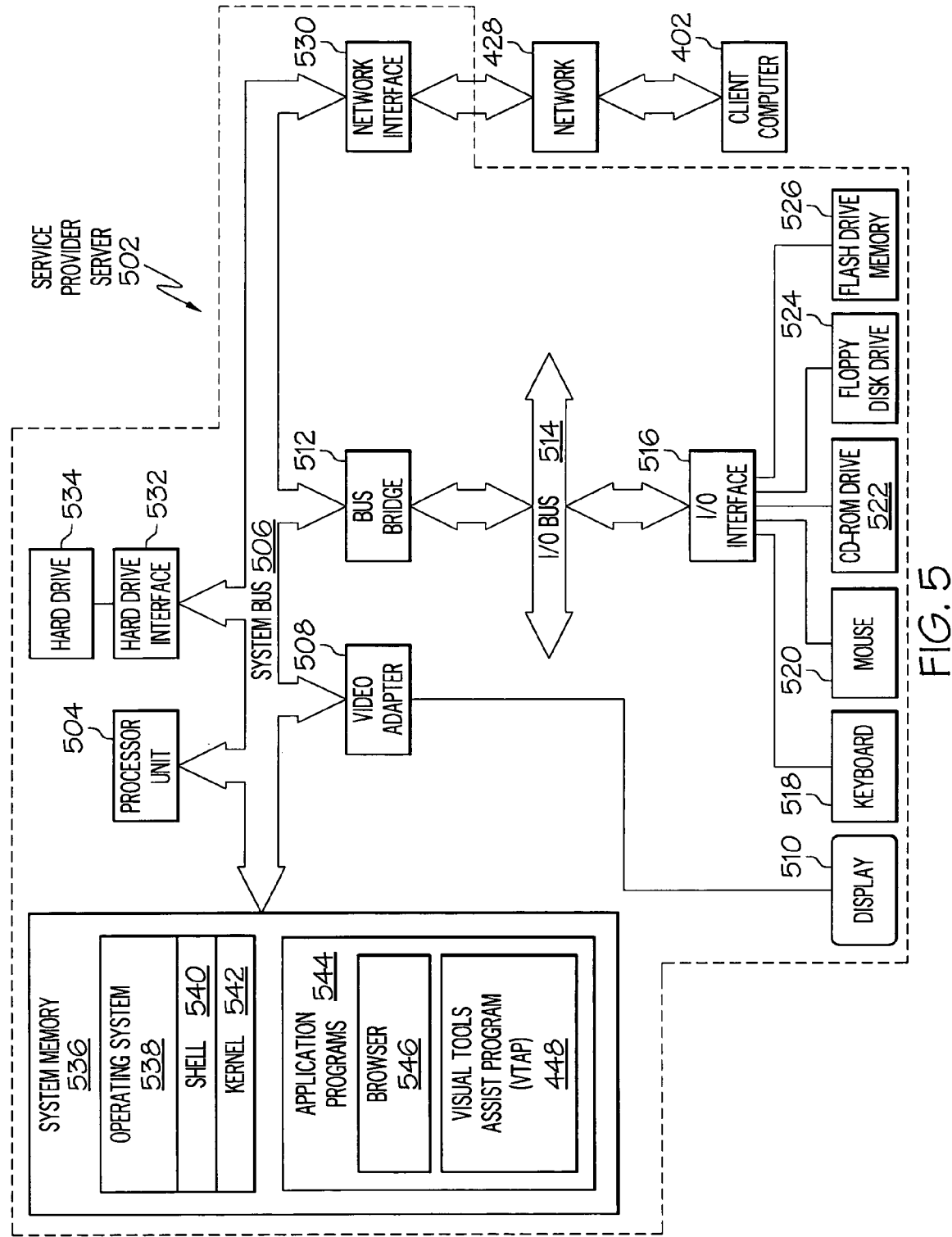
FIG. 5 illustrates an exemplary server from which software for executing the present invention may be deployed and/or implemented for the benefit of a user of the client computer shown in FIG. 4.

As noted above, VTAP 448 can be downloaded to client computer 402 from service provider server 502, shown in exemplary form in FIG. 5. Service provider server 502 includes a processor unit 504 that is coupled to a system bus 506. A video adapter 508 is also coupled to system bus 506. Video adapter 508 drives/supports a display 510. System bus 506 is coupled via a bus bridge 512 to an Input/Output (I/O) bus 514. An I/O interface 516 is coupled to I/O bus 514. I/O interface 516 affords communication with various I/O devices, including a keyboard 518, a mouse 520, a Compact Disk-Read Only Memory (CD-ROM) drive 522, a floppy disk drive 524, and a flash drive memory 526. The format of the ports connected to I/O interface 516 may be any known to those skilled in the art of computer architecture, including but not limited to Universal Serial Bus (USB) ports.

Service provider server 502 is able to communicate with client computer 402 via network 428 using a network interface 530, which is coupled to system bus 506. Access to network 428 allows service provider server 502 to execute and/or download VTAP 448 to client computer 402.

System bus 506 is also coupled to a hard drive interface 532, which interfaces with a hard drive 534. In a preferred embodiment, hard drive 534 populates a system memory 536, which is also coupled to system bus 506. Data that populates system memory 536 includes service provider server 502's operating system 538, which includes a shell 540 and a kernel 542. Shell 540 is incorporated in a higher level operating system layer and utilized for providing transparent user access to resources such as application programs 544, which include a browser 546, and a copy of VTAP 448 described above, which can be deployed to client computer 402.

The hardware elements depicted in service provider server 502 are not intended to be exhaustive, but rather are representative to highlight essential components required by the present invention. For instance, service provider server 502 may include alternate memory storage devices such as flash drives, magnetic cassettes, Digital Versatile Disks (DVDs), Bernoulli cartridges, and the like. These and other variations are intended to be within the spirit and scope of the present invention.

Note further that, in a preferred embodiment of the present invention, service provider server 502 performs all of the functions associated with the present invention (including execution of VTAP 448), thus freeing client computer 402 from using its resources.

It should be understood that at least some aspects of the present invention may alternatively be implemented in a computer-useable medium that contains a program product. Programs defining functions on the present invention can be delivered to a data storage system or a computer system via a variety of signal-bearing media, which include, without limitation, non-writable storage media (e.g., CD-ROM), writable storage media (e.g., hard disk drive, read/write CD ROM, optical media), and communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Software Deployment

As described above, in one embodiment, the processes described by the present invention, including the functions of VTAP 448, are performed by service provider server 502. Alternatively, VTAP 448 and the method described herein, and in particular as shown and described in FIGS. 2a-3, can be deployed as a process software from service provider server 502 to client computer 402. Still more particularly, process software for the method so described may be deployed to service provider server 502 by another service provider server (not shown).

Figure 6A:
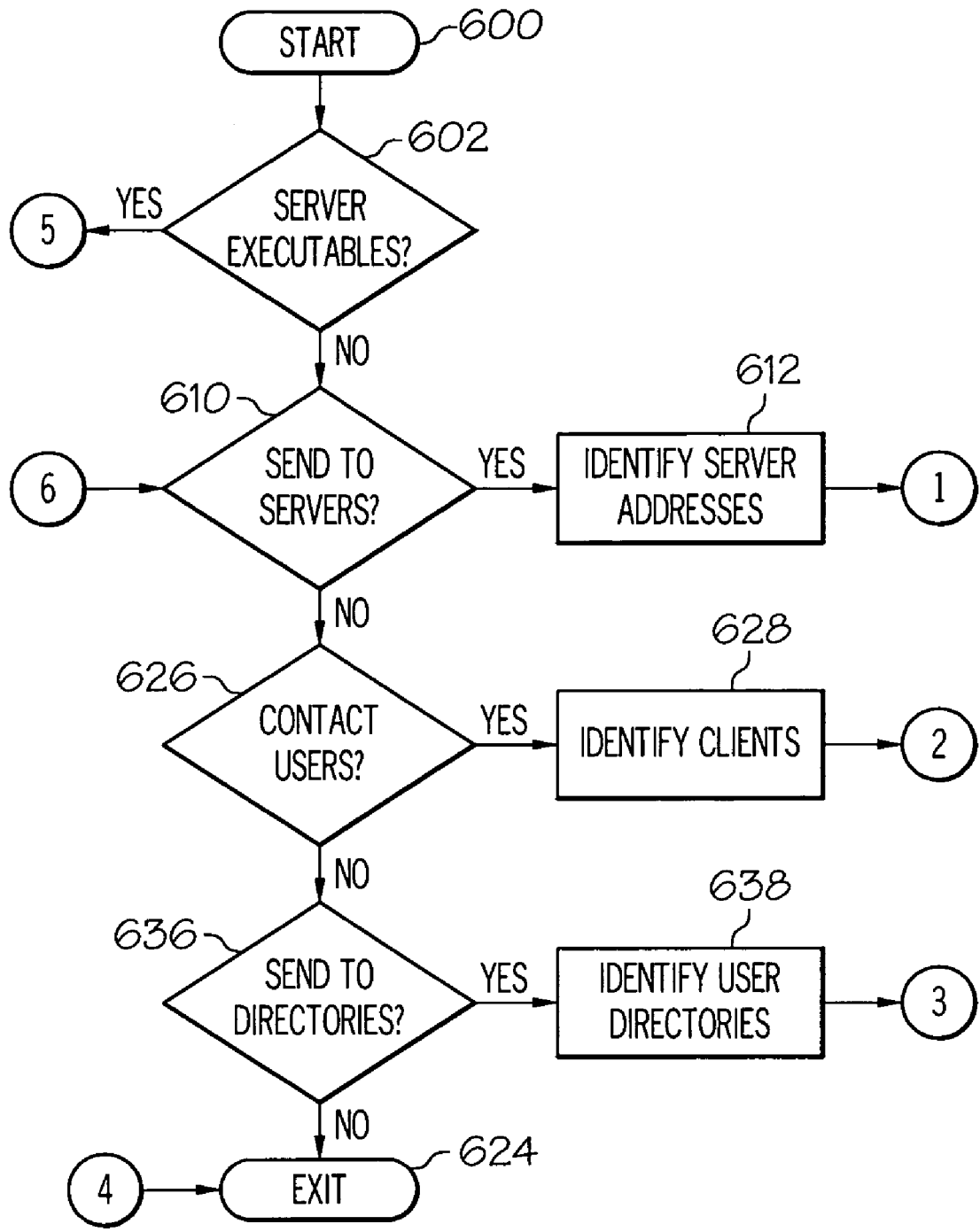
FIGS. 6a-b show a flow-chart of steps taken to deploy software capable of executing the steps shown and described in FIGS. 2a-3.
Figure 6B:
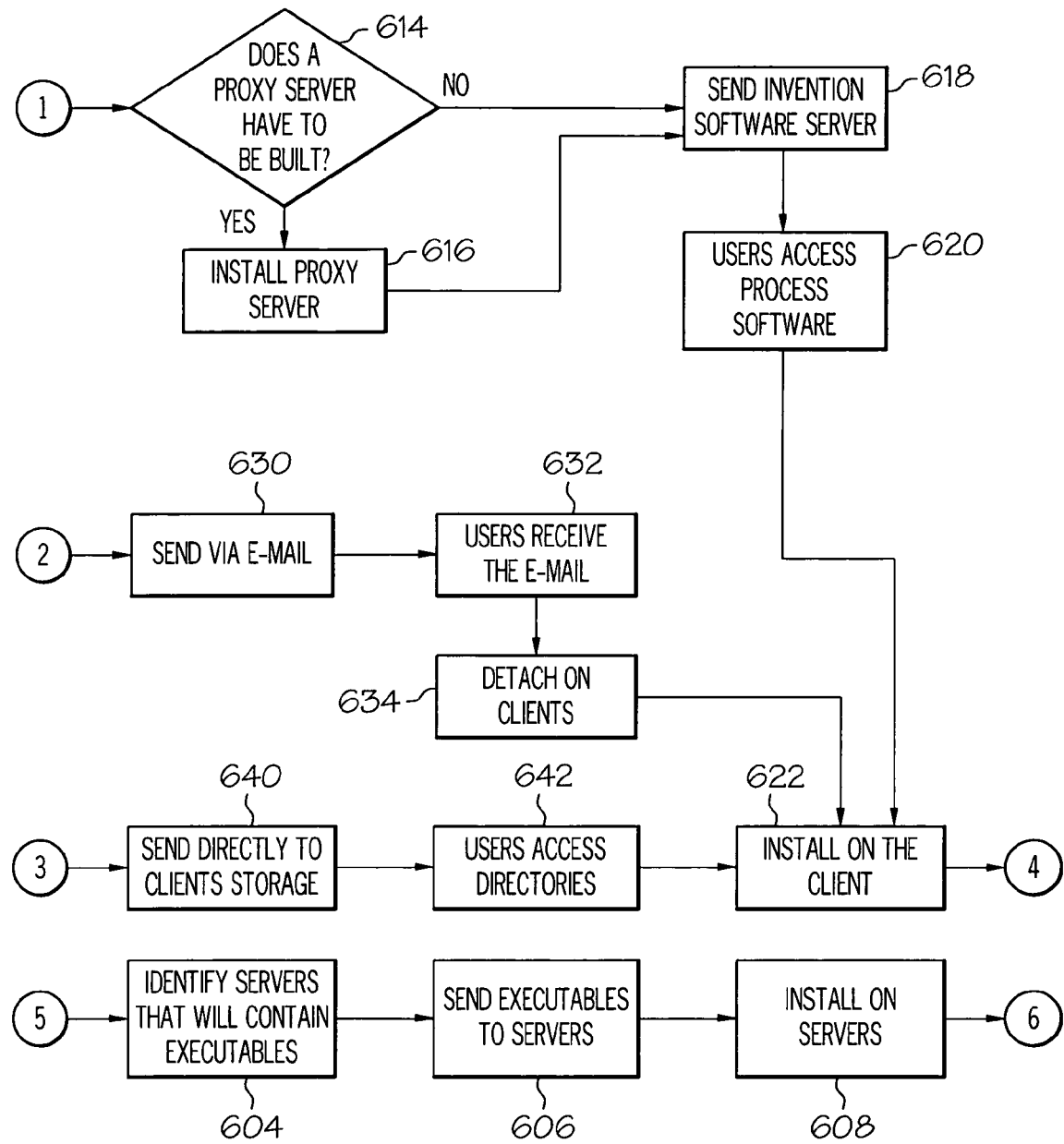

Referring then to FIGS. 6a-b, step 600 begins the deployment of the process software. The first thing is to determine if there are any programs that will reside on a server or servers when the process software is executed (query block 602). If this is the case, then the servers that will contain the executables are identified (block 604). The process software for the server or servers is transferred directly to the servers' storage via File Transfer Protocol (FTP) or some other protocol or by copying though the use of a shared file system (block 606). The process software is then installed on the servers (block 608).

Next, a determination is made on whether the process software is to be deployed by having users access the process software on a server or servers (query block 610). If the users are to access the process software on servers, then the server addresses that will store the process software are identified (block 612).

A determination is made if a proxy server is to be built (query block 614) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 616). The process software is sent to the servers either via a protocol such as FTP or it is copied directly from the source files to the server files via file sharing (block 618). Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems (block 620). Another embodiment is to have the servers automatically copy the process software to each client and then run the installation program for the process software at each client computer. The user executes the program that installs the process software on his client computer (block 622) then exits the process (terminator block 624).

In query step 626, a determination is made whether the process software is to be deployed by sending the process software to users via e-mail. The set of users where the process software will be deployed are identified together with the addresses of the user client computers (block 628). The process software is sent via e-mail to each of the users' client computers (block 630). The users then receive the e-mail (block 632) and then detach the process software from the e-mail to a directory on their client computers (block 634). The user executes the program that installs the process software on his client computer (block 622) then exits the process (terminator block 624).

Lastly a determination is made as to whether the process software will be sent directly to user directories on their client computers (query block 636). If so, the user directories are identified (block 638). The process software is transferred directly to the user's client computer directory (block 640). This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software (block 642). The user executes the program that installs the process software on his client computer (block 622) and then exits the process (terminator block 624).

VPN Deployment

The present software can be deployed to third parties as part of a service wherein a third party VPN service is offered as a secure deployment vehicle or wherein a VPN is build on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a company's multiple fixed sites over a public network such as the Internet.

The process software is transported over the VPN via tunneling which is the process of placing an entire packet within another packet and sending it over a network. The protocol of the outer packet is understood by the network and both points, called runnel interfaces, where the packet enters and exits the network.

Software Integration

The process software which consists code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists match the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

On Demand

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 7A:
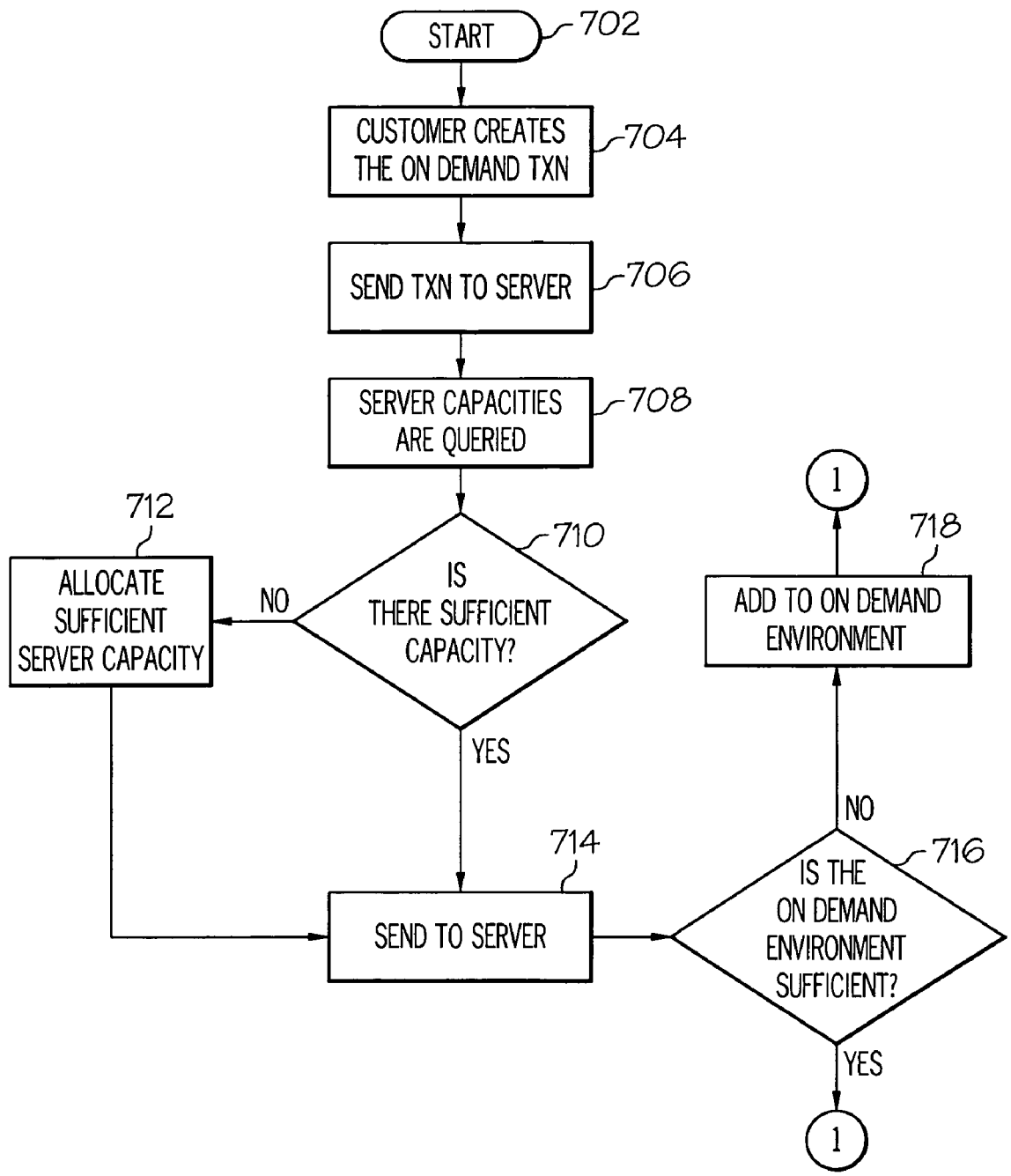
FIGS. 7a-b show a flow-chart showing steps taken to execute the steps shown and described in FIGS. 2a-3 using an on-demand service provider.
Figure 7B:
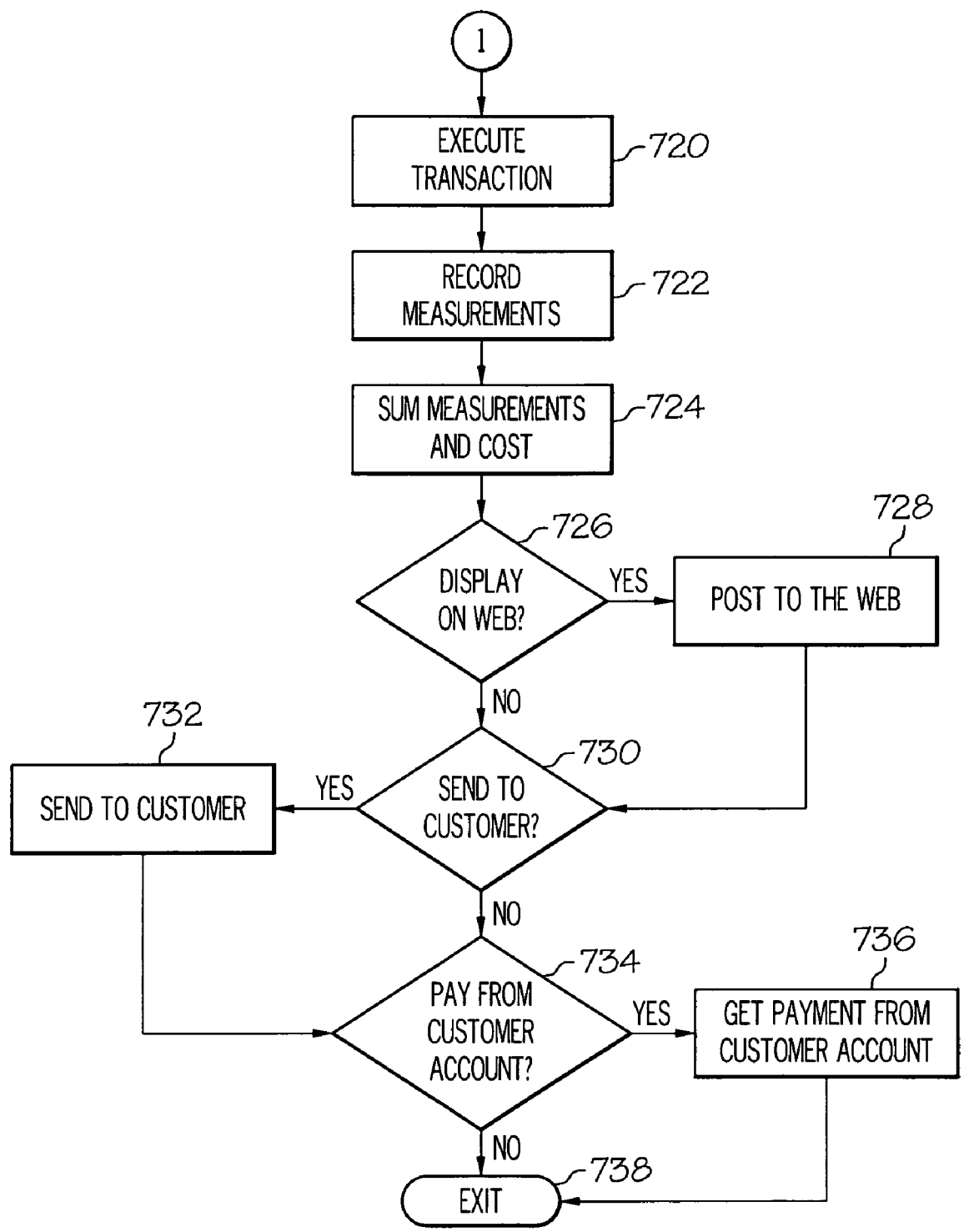

With reference now to FIGS. 7*a-b,* initiator block 702 begins the On Demand process. A transaction is created than contains the unique customer identification, the requested service type and any service parameters that further, specify the type of service (block 704). The transaction is then sent to the main server (block 706). In an On Demand environment the main server can initially be the only server, then as capacity is consumed other servers are added to the On Demand environment.

The server central processing unit (CPU) capacities in the On Demand environment are queried (block 708). The CPU requirement of the transaction is estimated, then the servers available CPU capacity in the On Demand environment are compared to the transaction CPU requirement to see if there is sufficient CPU available capacity in any server to process the transaction (query block 710). If there is not sufficient server CPU available capacity, then additional server CPU capacity is allocated to process the transaction (block 712). If there was already sufficient Available CPU capacity then the transaction is sent to a selected server (block 714).

Before executing the transaction, a check is made of the remaining On Demand environment to determine if the environment has sufficient available capacity for processing the transaction. This environment capacity consists of such things as but not limited to network bandwidth, processor memory, storage etc. (block 716). If there is not sufficient available capacity, then capacity will be added to the On Demand environment (block 718). Next the required software to process the transaction is accessed, loaded into memory, then the transaction is executed (block 720).

The usage measurements are recorded (block 722). The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 724).

If the customer has requested that the On Demand costs be posted to a web site (query block 726), then they are posted (block 728). If the customer has requested that the On Demand costs be sent via e-mail to a customer address (query block 730), then these costs are sent to the customer (block 732). If the customer has requested that the On Demand costs be paid directly from a customer account (query block 734), then payment is received directly from the customer account (block 736). The On Demand process is then exited at terminator block 738.

The present invention, as described, provides a method, system and computer program product for correlating source code in a source code view pane with a control in a graph view pane of a GUI that is being modified (created, amended, etc.) in an IDE. In one embodiment, the method includes the steps of: receiving, from a user of a source code view pane, an entered name of a type of control located in a graph view pane of a Graphical User Interface (GUI) to be modified in an Integrated Development Environment (IDE); in response to a hyperbutton being activated, displaying a mini-GUI in the source code view pane, wherein the mini-GUI displays all controls that have the entered name as part of their source code; and in response to a selection of a selected control in the mini-GUI, dismissing the mini-GUI and pasting in the source code view pane a name of an actual source code object that, when executed, displays the selected control in the GUI. The name of the actual source code object may be highlighted either on a new line of the source code view pane, or the name may be highlighted in the source code view pane at an existing line of code for the actual source code object of the selected control. The source code view pane and the graph view pane may be on separate screens that are not simultaneously viewable. Alternatively, the source code view pane and the graph view pane may be viewable on a same screen of the IDE, wherein the method further comprises highlighting the selected control in the graph view pane of the IDE. The control being created/modified in the GUI may be a data entry field, a widget, or any other control found in a GUI.

While the present invention has been particularly shown and described with reference to a preferred embodiment, it will be understood by those skilled in the art that various changes in form and detail may be made therein without departing from the spirit and scope of the invention. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A computer-implemented method comprising:
utilizing a processor in a computer to execute computer program instructions that, when executed, perform the steps of:
receiving, from a user of a source code view pane, an entered name of a control that is to be modified in an Integrated Development Environment (IDE), wherein the control is a data entry field that is displayed in a What You See Is What You Get (WYSIWYG) graph view pane of a Graphical User Interface (GUI) and follows a naming convention that describes what type of data can be entered in the data entry field plus at least one unique numeral to form different names for different data entry fields found in the WYSIWYG graph view, and wherein the source code view pane and the WYSIWYG graph view pane are on separate screens that are not simultaneously viewable in the IDE;
in response to a combination of an activation of a control key activation of a control key and a cursor over an entered name in the source code pane, displaying a mini-GUI in the source code view pane, wherein the mini-GUI displays a pictorial representation of all controls found in the WYSIWYG graph view that have the entered name as a portion of their name, and wherein the source code for different data entry fields found in the WYSIWYG graph view includes different lines of source code for each of the data entry fields in the WYSIWYG graph view pane;
in response to a selection of a selected control in the mini-GUI;
causing the mini-GUI to disappear from view from the source code view pane, and
placing, in the source code view pane, a name of an actual source code object that, when ultimately executed at a future time, displays the selected control in the GUI, wherein the name of the actual source code object is highlighted in a display, in the source code view pane, of the actual source code object for the selected control;
displaying, in the IDE, a design button that correlates with the WYSIWYG graph view pane; and
displaying, in the IDE, a source button that correlates with the source code view pane, wherein alternatively clicking the design button and the source button permits toggling back and forth between the source code view pane and the WYSIWYG graph view pane without losing a display of a rest of an IDE GUI that includes a source outline view pane and a component outline view pane.

2. A system comprising:
a processor;
a data bus coupled to the processor;
a memory coupled to the data bus; and
a computer storage medium embodying computer program code, the computer program code comprising instructions executable by the processor and configured for:
receiving, from a user of a source code view pane, an entered name of a control that is to be modified in an Integrated Development Environment (IDE), wherein the control is a data entry field that is displayed in a What You See Is What You Get (WYSIWYG) graph view pane of a Graphical User Interface (GUI) and follows a naming convention that describes what type of data can be entered in the data entry field plus at least one unique numeral to form different names for different data entry fields found in the WYSIWYG graph view, and wherein the source code view pane and the WYSIWYG graph view pane are on separate screens that are not simultaneously viewable in the IDE;
in response to a combination of an activation of a control key activation of a control key and a cursor over an entered name in the source code pane, displaying a mini-GUI in the source code view pane, wherein the mini-GUI displays a pictorial representation of all controls found in the WYSIWYG graph view that have the entered name as a portion of their name, and wherein the source code for different data entry fields found in the WYSIWYG graph view includes different lines of source code for each of the data entry fields in the WYSIWYG graph view pane;

in response to a selection of a selected control in the mini-GUI;

causing the mini-GUI to disappear from view from the source code view pane, and placing, in the source code view pane, a name of an actual source code object that, when ultimately executed at a future time, displays the selected control in the GUI, wherein the name of the actual source code object is highlighted in a display, in the source code view pane, of the actual source code object for the selected control;

displaying, in the IDE, a design button that correlates with the WYSIWYG graph view pane; and displaying, in the IDE, a source button that correlates with the source code view pane, wherein alternatively clicking the design button and the source button permits toggling back and forth between the source code view pane and the WYSIWYG graph view pane without losing a display of a rest of an IDE GUI that includes a source outline view pane and a component outline view pane.

3. A computer storage medium embodying computer program code, the computer program code comprising executable instructions when executed by a processor perform the steps of:

receiving, from a user of a source code view pane, an entered name of a control that is to be modified in an Integrated Development Environment (IDE), wherein the control is a data entry field that is displayed in a What You See Is What You Get (WYSIWYG) graph view pane of a Graphical User Interface (GUI) and follows a naming convention that describes what type of data can be entered in the data entry field plus at least one unique numeral to form different names for different data entry fields found in the WYSIWYG graph view, and wherein the source code view pane and the WYSIWYG graph view pane are on separate screens that are not simultaneously viewable in the IDE;

in response to a combination of an activation of a control key activation of a control key and a cursor over an entered name in the source code pane, displaying a mini-GUI in the source, code view pane, wherein the mini-GUI displays a pictorial representation of all controls found in the WYSIWYG graph view that have the entered name as a portion of their name, and wherein the source code for different data entry fields found in the WYSIWYG graph view includes different lines of source code for each of the data entry fields in the WYSIWYG graph view pane;

in response to a selection of a selected control in the mini-GUI;

causing the mini-GUI to disappear from view from the source code view pane, and placing, in the source code view pane, a name of an actual source code object that, when ultimately executed at a future time, displays the selected control in the GUI, wherein the name of the actual source code object is highlighted in a display, in the source code view pane, of the actual source code object for the selected control;

displaying, in the IDE, a design button that correlates with the WYSIWYG graph view pane; and displaying, in the IDE, a source button that correlates with the source code view pane, wherein alternatively clicking the design button and the source button permits toggling back and forth between the source code view pane and the WYSIWYG graph view pane without losing a display of a rest of an IDE GUI that includes a source outline view pane and a component outline view pane.

4. The computer-implemented method of claim 1, wherein the type of data can be entered in the data entry field is limited to text data.

* * * * *